(12) United States Patent
Tuovinen et al.

(10) Patent No.: US 6,509,888 B1
(45) Date of Patent: Jan. 21, 2003

(54) METHOD FOR POINTING OUT INFORMATION AND A POINTING DEVICE

(75) Inventors: Juhani Tuovinen, Espoo (FI); Ossi Pöllänen, Espoo (FI); Jauri Manner, Helsinki (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/570,465

(22) Filed: May 12, 2000

(30) Foreign Application Priority Data

May 12, 1999 (FI) .................................. 991101

(51) Int. Cl.$^7$ ................................................ G09G 5/08
(52) U.S. Cl. ........................................ 345/156; 345/158
(58) Field of Search .............................. 345/163, 157,
345/167, 158, 159, 164, 161; 364/190; 338/128; 463/38

(56) References Cited

U.S. PATENT DOCUMENTS

| | | | |
|---|---|---|---|
| 3,317,829 A | 5/1967 | Kuhrt et al. .................. 324/69 |
| 4,054,861 A | 10/1977 | Markison .................... 338/32 H |
| 4,134,030 A | 1/1979 | Pace .......................... 307/309 |
| 4,500,867 A | 2/1985 | Ishitobi et al. .............. 338/128 |
| 5,583,541 A | * 12/1996 | Solhjell ....................... 345/157 |
| 5,687,080 A | * 11/1997 | Hoyt et al. .................. 345/161 |
| 5,714,980 A | 2/1998 | Niino ......................... 345/160 |
| 5,831,553 A | * 11/1998 | Lenssen et al. .............. 341/20 |
| 5,929,846 A | * 7/1999 | Rosenberg et al. .......... 345/156 |
| 6,225,980 B1 | * 5/2001 | Weiss et al. ................. 345/156 |
| 6,248,018 B1 | * 6/2001 | Kehlstadt et al. ........ 273/148 B |
| 6,256,011 B1 | * 7/2001 | Culver ........................ 345/156 |
| 6,266,046 B1 | * 7/2001 | Arita ........................... 345/156 |

FOREIGN PATENT DOCUMENTS

| | | |
|---|---|---|
| EP | 0755142 A3 | 1/1997 |
| EP | 0810544 A2 | 12/1997 |
| EP | 0810544 A3 | 12/1997 |
| WO | WO 93/20535 | 10/1993 |

OTHER PUBLICATIONS

Patent Abstracts of Japan, Publication No. 59088604.
Patent Abstracts of Japan, Publication No. 57163587.

* cited by examiner

Primary Examiner—Vijay Shankar
Assistant Examiner—Nitin Patel
(74) Attorney, Agent, or Firm—Perman & Green, LLP

(57) ABSTRACT

A pointing device that comprises a movable pointing element and a detector. The pointing element affects a magnetic field the changes of which are detected by the detector and adapted so as to point out information. The detector that produces a detection signal on the basis of which the movement of the pointing element is sensed and utilized to point out information on a display. The movable pointing element and the detector comprises means for generating a magnetic field and for detecting a magnetic field. The pointing element includes a plurality of magnetic elements placed on a perimeter of the pointing element.

29 Claims, 12 Drawing Sheets

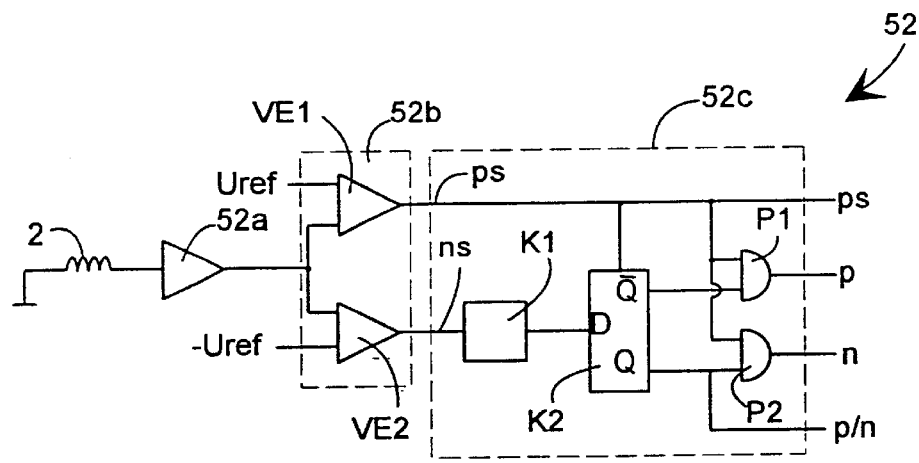
FIG. 2A
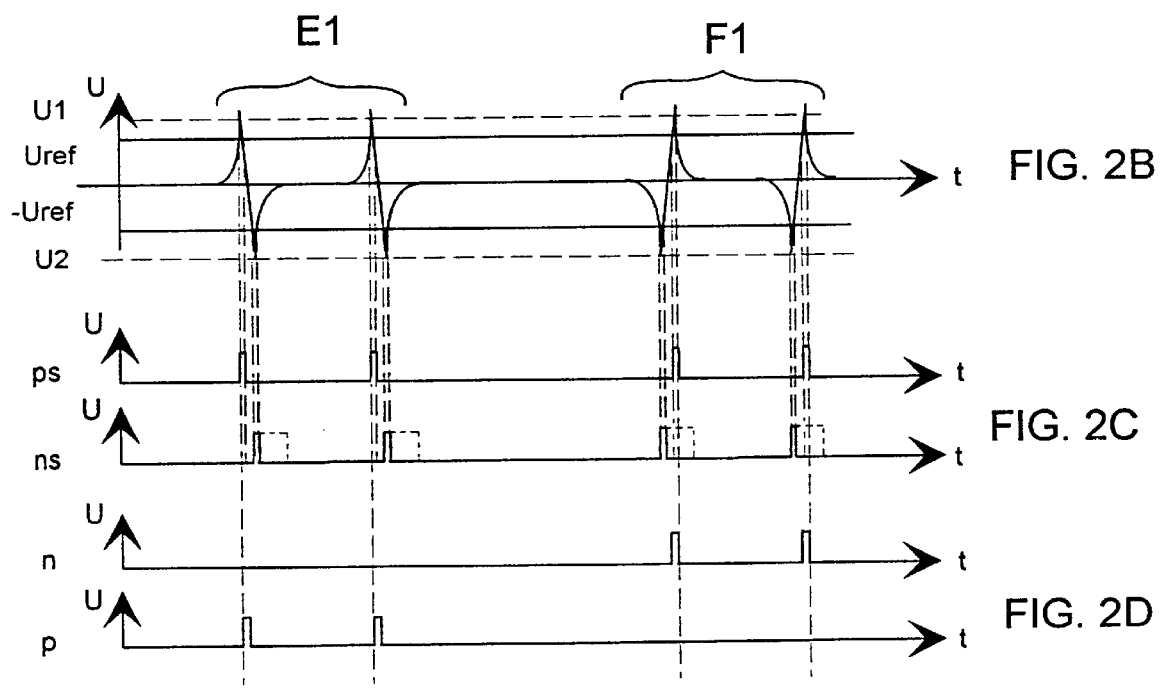
FIG. 2B
FIG. 2C
FIG. 2D

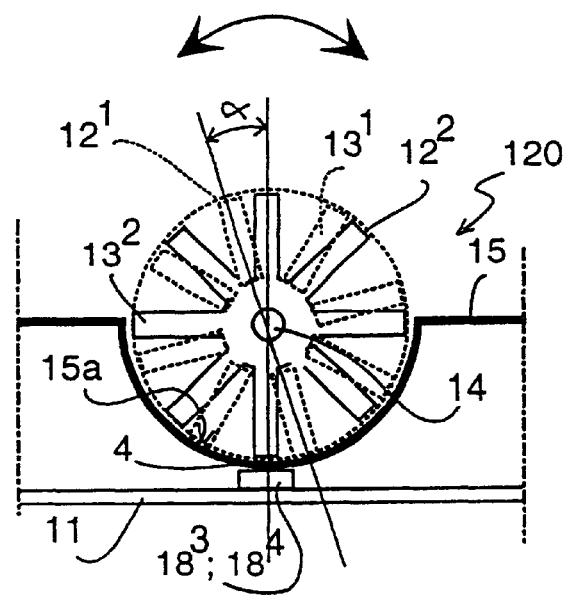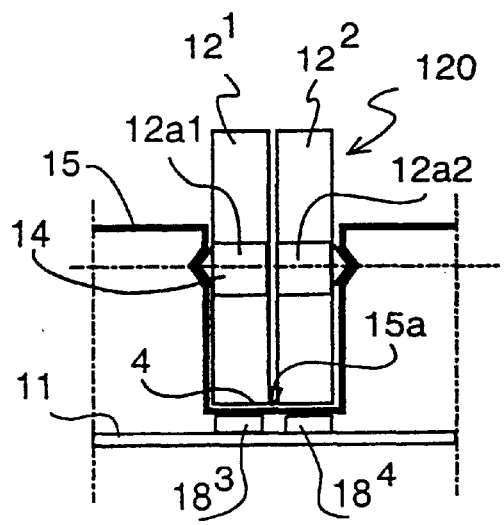
FIG. 10A  FIG. 10B
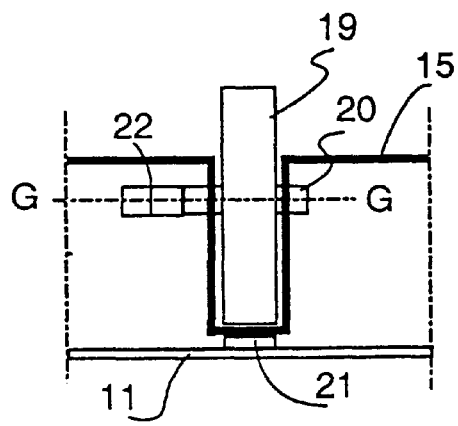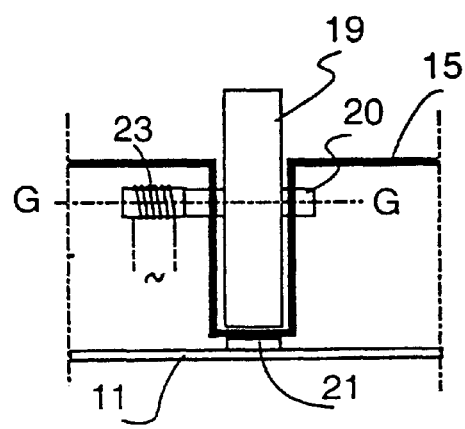
FIG. 11A  FIG. 11B

METHOD FOR POINTING OUT INFORMATION AND A POINTING DEVICE

BACKGROUND OF THE INVENTION

The invention relates to a method according to the preamble of claim 1 for pointing out information.

The invention also relates to a pointing device according to the preamble of claim 4.

The pointing device is used to control an electrical, advantageously electron apparatus such as a mobile phone, media terminal, recorder, radio receiver, television, CD player or a DVD player, for example.

The pointing device comprises a pointing element and a detector. The pointing element is moved directly by means of a finger or indirectly by means of an auxiliary device. The position and/or movement of the pointing element are sensed by the detector and in accordance with the movement a pointer (cursor) is moved on a display and/or a selection window is moved in a menu group in order to select a particular functions menu.

From the prior art it is known electromechanical pointing devices such as e.g. perimetrically perforated or radially slotted disc as a movable pointing element and an electrically conductive brush fitted on the perimeter of the disc as a detector.

A problem with electromechanical pointing devices is that the pointing element an detector are in contact with each other. The brush or a corresponding detector an the pointing element are exposed to mechanical wear and dirt, which among other things result in a limited life for the pointing device.

From the prior art it is known electro-optic pointing devices which include a perimetrically perforated or radially slotted disc as a movable pointing element and a optical detector such as a photocell fitted on the perimeter of the disc.

A problem with electro-optic pointing devices is the accumulation of dirt. At some point, depending on the operating conditions, the light signal produced by the light source in the detector wilt not reach the receiver of the detector any more because of dirty window surfaces, thus causing the pointing device to malfunction.

SUMMARY OF THE INVENTION

An object of the invention is to eliminate the disadvantages associated with the pointing devices described above. Another object of the invention is to provide novel pointing device which is simple, reliable and has a long life.

The method according to the invention is characterized by what is expressed in claim 1. The pointing device according to the invention is characterized by what is expressed in claim 4. The dependent claims define preferred embodiments of the invention.

In the method according to the invention information is pointed out on a display by means of a pointing device which comprises a movable pointing element and a detector. In accordance with the invention, the movement of the pointing element affects a magnetic field the changes in which are sensed by the detector and are adapted so as to point out said information.

The method according to the invention uses a magnetic field to provide the user with tactile feedback of the movements of the pointing element.

The pointing device according to the invention comprises a movable pointing element and a detector that produces a detection signal on the basis of which the movement of the pointing element is sensed and utilized for painting out information on a display. According to the invention the movable pointing element and the detector comprise means for generating a magnetic field and for detecting a magnetic field. The means for generating a magnetic field comprises one or more magnetic elements. The means for detecting a magnetic field comprises at least one magnetic field detector.

An advantage of the invention is that the pointing element and the detector are physically completely isolated from one another, they are not in contact with each other. There is no direct electric connection or optical contact between them. Therefore, the detector can be protected against water, moisture, dust and, generally, any external harmful solids, liquids and gases.

An advantage of the invention is that it is reliable in operation and has a long life. This is primarily due to the fact that the pointing element and the detector are effectively separated and isolated from each other:.

An advantage of the invention is that it is simple in construction and the number of components needed in the pointing device is small.

An advantage of the invention is that the components in the pointing device are preferably conventional and generally available. The detector, for example, is advantageously realized as a coil. Thus the manufacturing costs in mass production are low.

An additional advantage of the invention is that the direction information of the movement of the pointing element can be output from the pointing device preferably by means of one conductor.

Another advantage of the invention is that the tactile feedback of the movement of the pointing element is distinct.

A further advantage of the invention is e.g. that the position of the pointing element can be controlled magnetically, there can be a plurality of pointing elements arranged in parallel, the pointing element can be relatively freely designed and it can also be made axially movable according to the intended use, for example.

BRIEF DESCRIPTION OF DRAWINGS

The invention and its other advantages are below described in detail, referring to the accompanying drawing in which

FIG. 2A shows a magnetic field detector and a second preprocessing unit;

FIG. 2B graphically shows voltage pulses obtained from the magnetic field detector when the pointing element is moved in one direction and the direction of the movement is reversed; and FIG. 2C graphically shows detection pulses generated by a comparator in the preprocessing unit when the direction of movement of the painting element is changed;

FIG. 2D shows output signals of the second preprocessing unit;

FIG. 10A shows a side view of a sixth pointing device according to the invention in partial cross section and FIG. 10B shows a frontal view of it in partial cross section;

FIG. 11A shows a frontal view of a seventh pointing device according to the invention in partial cross section and FIG. 11B shows a modification of this embodiment;

DETAILED DESCRIPTION

Figure 1A:
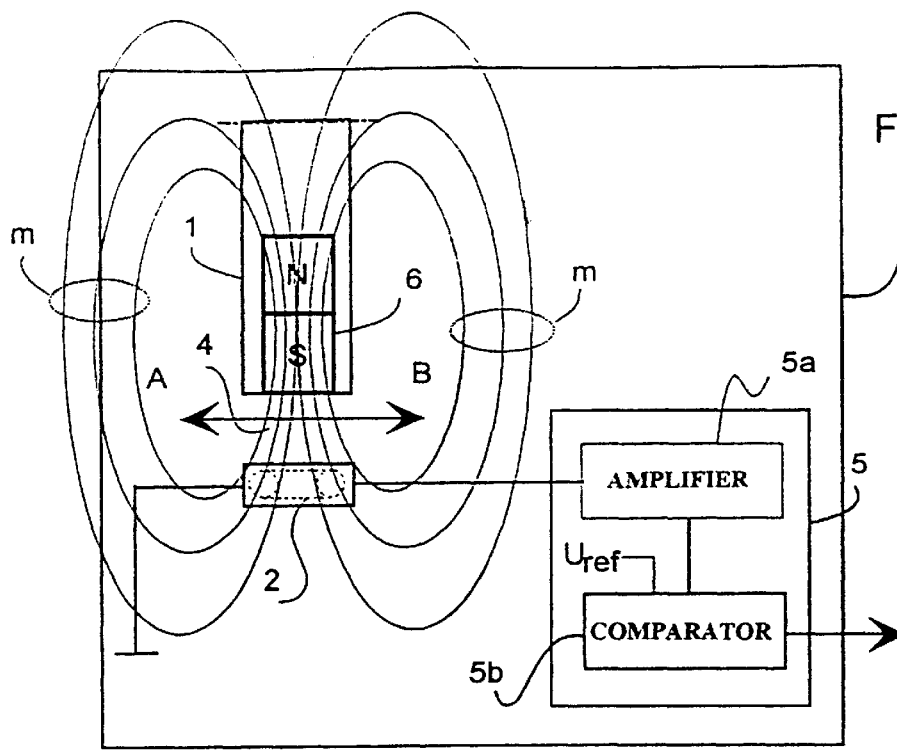
FIG. 1A is a conceptual illustration of the method and pointing device according to the invention.

The method according to the invention and the pointing device applying it are illustrated in FIG. 1A The pointing device comprises a painting element 1 and a detector 2. They are fitted into the housing 3 or body of an apparatus or into the housing or body of the remote control or the like of the apparatus proper. There is an air gap 4 between the pointing element 1 and detector 2. A magnetic field m is generated in the pointing device by means of a magnet 6. The detector 2 comprises at least one magnetic field detector. The strength of the magnetic field m varies in the detector 2 depending on the movement and/or position of the pointing element 1 as well as on the size of the air gap 4. The magnetic field detector 2 is connected to a preprocessing unit 5. A measurement signal produced by the detector 2 representing the strength and/or change of the magnetic field m is amplified and shaped in the preprocessing unit 5.

The detector 2 is preferably a winding such as a coil or choke, for example. It is known that an electromotive force is induced in a winding when the magnetic flux through the winding and, hence, the magnetic field strength, varies. When the winding is a closed conductive circuit the electromotive force produces a momentary electric current which in turn is converted into a voltage pulse in a suitable load. The relative movement A, B, FIG. 1A of the pointing element 1 and detector 2 influences the magnetic field strength sensed by the detector. The electromotive force induced in the detector 2 and the voltage pulse are processed in the preprocessing unit 5. FIG. 1A shows by means of a dotted line one possible position of the detector coil 2 relative to the pointing device.

Figure 1B:
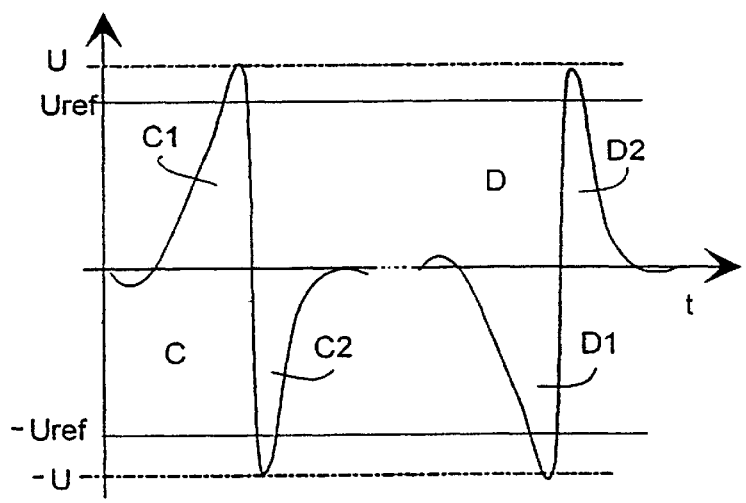
FIG. 1B graphically shows voltage pulses obtained from a magnetic field detector in a preferred embodiment of the invention.

As the magnetic field m is moved relative to the detector 2 in accordance with FIG. 1A in direction A (or the detector 2 is moved relative to the magnetic field m in direction B), the result is signal C at the output of amplifier 5a, shown in FIG. 1B, which first shows a positive voltage pulse C1 followed by a negative, voltage pulse C2. Correspondingly, as the magnetic field m is moved relative to the detector 2 in accordance with FIG. 1A in direction B (or the detector 2 is moved relative to the magnetic field m in direction A), the result is signal D shown in FIG. 1B which first shows a negative voltage pulse D1 followed by a positive voltage pulse D. Thus, the directions of movement A, B can be distinguished on the basis of the direction of change of the detected voltage pulse C1, D1 as the magnetic field m passes by the detector (or vice versa).

The preprocessing unit 5 comprises in the embodiment of FIG. 1A an amplifier 5a and a comparator 5b. The measurement signal level amplified by amplifier 5a, such as the voltage level U (or −U) of a voltage pulse, FIG. 1B, is examined at comparator 5b. With respect to a reference level such as a reference voltage Uref (or −Uref). If the measurement signal level exceeds the positive reference level, comparator 5b. produces a detection pulse ps, FIG. 1C. If the measurement signal level goes below the negative reference level, comparator 5b, produces a detection pulse ns, FIG. 1D.

Figure 1C:
FIGS. 1C and 1D graphically show detection pulses obtained from a preprocessing unit.
Figure 1D:
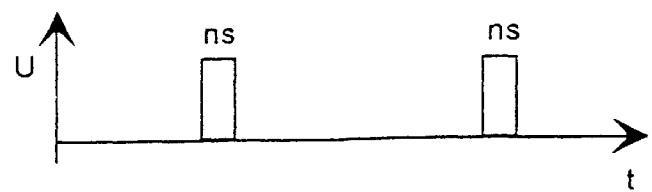

Otherwise no detection pulse is produced. FIG. 1B shows in succession the pulse shapes as the pointing element moves in opposite directions. FIGS. 1B, 1C and 1D show that the direction of movement of the pointing element can be detected on the basis of the order in which the positive and negative voltage pulse are observed.

Figure 1E:
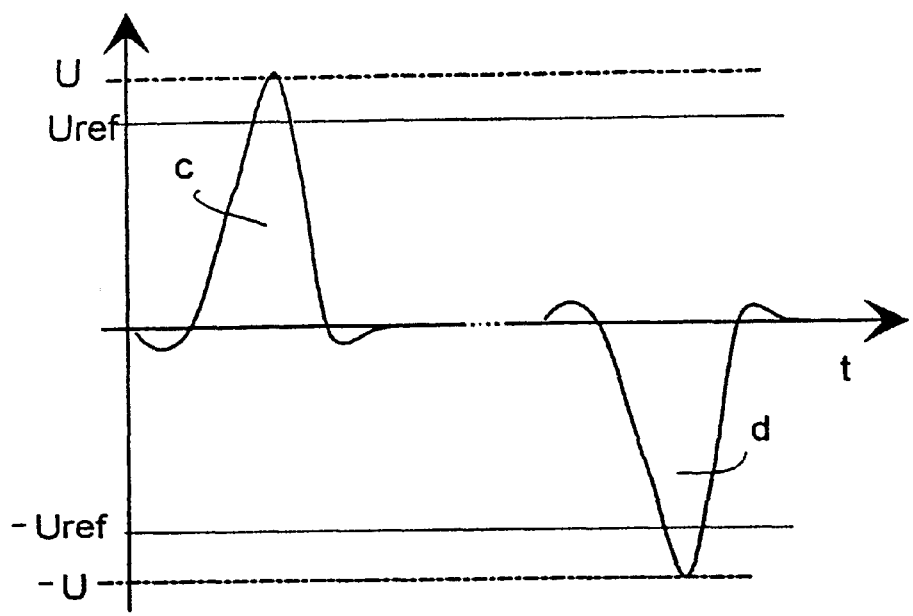
FIG. 1E graphically shows voltage pulses obtained from a magnetic field detector in a second preferred embodiment of the invention.
Figure 1F:
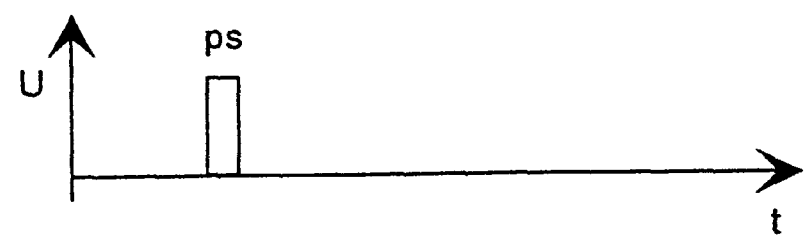
FIGS. 1F and 1G graphically show detection pulses obtained from a preprocessing unit in the embodiment according to FIG. 1E.
Figure 1G:
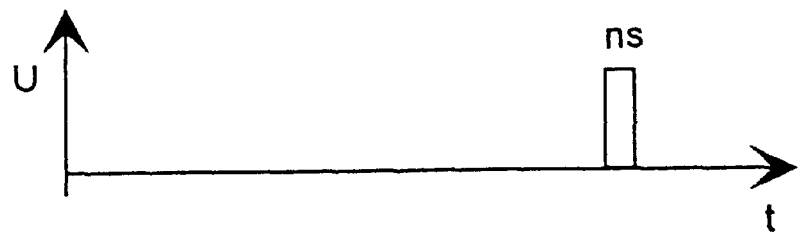

FIG. 1E shows the voltage level of an amplified measurement signal in an embodiment where the position of the detector tail 2 is turned 90° from the position shown in FIG. 1A in the plane shown. Here the movement of the magnetic field generated by the pointing element produces either a positive pulse c or negative pulse d depending an the direction of the movement of the pointing element. FIGS. 1F and 1G show, respectively, pulse ps corresponding to a positive signal and pulse ns corresponding to a negative signal, obtained after the voltage comparator. This position of the detector coil is advantageous because the direction of movement of the pointing element can be detected directly by means of two voltage comparators. It is thus not necessary to observe the mutual order of the successive positive and negative pulses ps, ns obtained from the voltage comparator as in the embodiment illustrated by FIGS. 1B, 1C and 1D.

The detection pulses ps, ns are processed by means of a suitable processing unit following the preprocessing unit 5, preferably by a microcontroller or a similar data processing unit, and the detection information obtained is used for pointing out information on a display or corresponding presentation means.

The magnetic field detector 2 and a second embodiment of the preprocessing unit are graphically illustrated in FIG. 2A. The preprocessing unit 52 comprises an amplifier 52a, comparator 52b and a logic unit 52c. The comparator 52b includes two comparing units VE1 and VE2. When processing signals according to FIGS. 1B to 1D the logic unit 52c advantageously comprises a monostable flip-flop K1, D flip-flop K2 and two AND gates P1, P2. The detector 2 is connected via amplifier 52a to a first input of both comparing units VE1 and VE2 in comparator 52b. Reference voltages Uref and −Uref are connected, respectively, to second inputs of comparing units VE1, VE2. The level of the measurement signal obtained from the detector 2 and amplified by amplifier 52a, i.e. the voltage level U1 or −U2 of the voltage pulse, FIG. 2B, is examined at comparator 52b with respect to a reference level, i.e. reference voltages Uref and −Uref. When the measurement signal level U1 exceeds the positive reference voltage Uref, the first comparing unit VE1 outputs a first detection pulse ps and, correspondingly, when the measurement signal level −U2 exceeds the negative reference voltage −Uref, the second comparing unit VE2 outputs a second detection pulse ns.

When necessary, the preprocessing unit 52 also serves as a detector for the direction of movement A, B of the painting element 1. The direction of movements is then determined on the basis of the mutual chronological order of the occurrence of the voltage pulses obtained from the detector 2.

FIG. 2B graphically illustrates voltage pulses E1, F1 of the detector 2 when the direction of movement of the pointing element is changed after a few pulses from one direction to a second opposite direction. These pulses are used to form in the preprocessing unit 52, FIG. 2A, detection pulses ps and pn according to FIG. 2C. In said preprocessing unit, detection pulse ns, which indicates a voltage below the reference voltage −Uref, is suitably prolonged by means of the monostable flip-flop K1 so that the D flip-flop K2 indicates by its Q output whether the detection pulse ns came before or after the ps detection pulse serving as a clock pulse.

The preprocessing unit 52 in FIG. 2A generates the output pulse p of FIG. 2D when the magnetic field m passes by the detector 2 in one direction, and the output pulse n of FIG. 2D when the magnetic field m passes by the detector in a second direction. Alternatively it is possible to separately generate from the output Q of the D flip-flop K2 direction information p/n which is used together with a clock pulse, in this case the detection pulse ps.

Optionally the detector 2 is a Hall sensor that can also detect a magnetic field which is stationary with respect to the detector. A problem with such a detector is its price when considering the use of the detector in a consumer product or the like which should be manufactured with minimal costs. Another problem is the indication of the direction of movement as ordinary Hall elements only detect the magnetic flux density without polarity indication.

Indication of the direction of movement is advantageously realized using two Hall sensors or the like placed at a suitable distance from one another (cf. FIG. 9) Alternatively, the direction of movement can be indicated using one Hall sensor and two separate magnetic fluxes (and magnetic elements) (cf. FIGS. 10A and 10B).

Figure 3A:
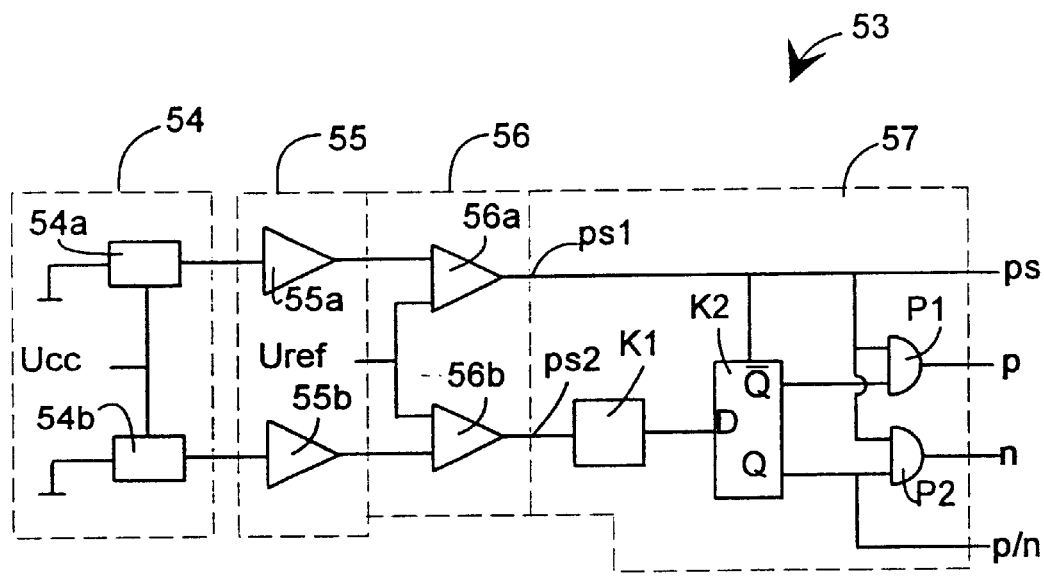
FIG. 3A shows a third preprocessing unit suitable for two detectors.

FIG. 3A shows an advantageous preprocessing unit 53 with a detector 54 at its input, said detector including two detection units, specifically Hall sensors, 54a, 54b. The preprocessing unit 53 comprises an amplifier 55; 55a, 55b and, following it, a comparator 56; 56a, 56b for both Hall sensors 54a, 54b. The comparator 56 is followed by a logic unit 57. The logic unit 57 is in this embodiment identical to the one in the preprocessing unit of FIG. 2A and like elements are denoted by like reference designators.

The Hall sensors 54a, 54b detect the magnetic field strength and its fluctuations. The detection signals obtained from the sensors 54a, 54b are amplified by amplifiers 55a, 55b, respectively, and the amplified detection signals are fed to first inputs of the respective comparing units 56a, 56b of the comparator 5b. A reference voltage Uref is connected to second inputs of the comparing units 56a, 56b. The outputs of comparator 54; 54a, 54b give signals ps1, ps2 which are fed to the logic unit 57.

Figure 3B:
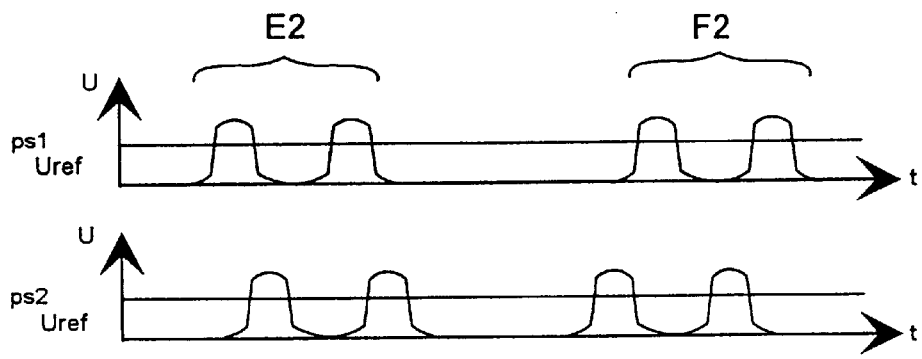
FIG. 3B graphically shows voltage pulses obtained from the magnetic field detectors.

FIG. 3B graphically illustrates the signals ps1, ps2 obtained from the outputs of the comparator 54; 54a, 54b when the direction of movement of the pointing element is changed in the same manner as in the example of FIG. 2B from a first direction E2 to a second opposite direction F2. It is seen that from the chronological order of signals ps1, ps2 one can determine the relative movement of the pointing element (i.e. E2 corresponds to direction E1 and F2 to direction F1, comparing to the example of FIG. 2B) in the same manner as on the basis of detection pulses ps, ns in FIG. 2C. Therefore the logic unit 57 or a corresponding unit can generate the same p, n and p/n signals as those produced by the preprocessing unit of FIG. 2A.

There are Hall detectors available that include, in addition to a Hall sensor 54a, 54b, an in-built amplifier 55a, 55b. When using such Hall detectors, there is no need for the amplifiers 55a, 55b in the preprocessing unit 53, FIG. 3A. It may be a problem that such detectors are expensive.

Alternatively the detector 2, 54 is a magnetoresistive sensor. The preprocessing unit 53 of FIG. 3A is suitable to be used in connection with such a sensor, too. However, an operating voltage Vcc has to be supplied to such a detector and the amplifier 55; 55a, 55b has to be balanced in order to achieve a good result.

Figure 4:
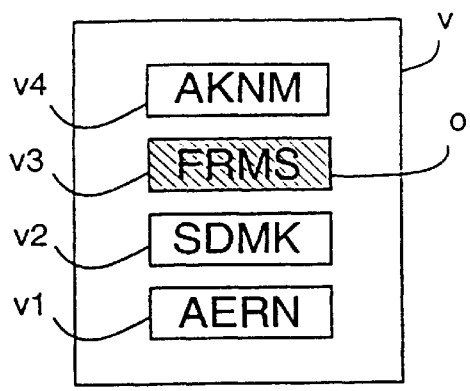
FIG. 4 illustrates how information is pointed out on a display.

FIG. 4 illustrates the painting out of information on a display. Let us assume that advantageously each positive pulse ps makes the pointer bar o (shadowed area) move up from a menu item v3 to the next menu item v4 in a menu field v comprised of stacked menu items v1, v2, v3, v4, and, conversely, a negative pulse ns makes the pointer bar o move in the opposite direction, e.g. to menu item v2. Thus, by moving the control element 1 by a suitable distance relative to the detector 2 and by changing the direction of movement A, B one can control the pointing out of information on a display.

The pointing device according to the invention shown in FIG. 1A comprises a movable pointing element 1 and a detector 2. In this schematic application example a magnet 6 has been fitted into the movable pointing element. The magnetic field detector 2 is advantageously realized using a coil, winding or a corresponding component. As the pointing element 1, particularly the magnet 6, is moved past the detector 2 the magnetic field m changes in the winding across a small air gap 4, first becoming stranger and then weaker, and this change is observed in the preprocessing unit 5 connected to the detector 2, as described above. The embodiments of the invention described below are primarily based on this same basic arrangement.

Figure 5A:
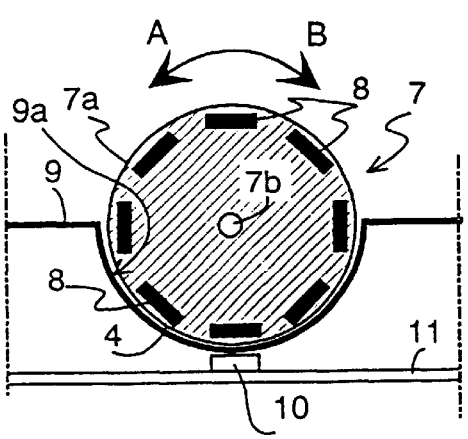
FIG. 5A shows a crass section of a pointing device according to the invention and FIG. 5B shows a frontal view of it in partial cross section.
Figure 5B:
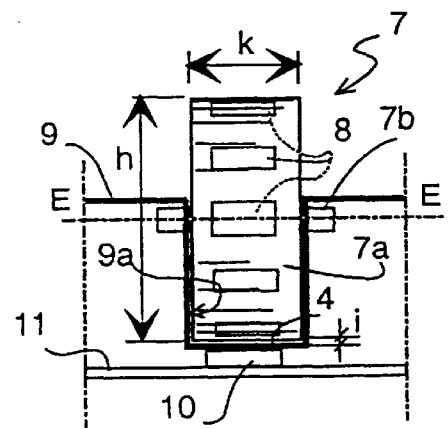

A pointing device according to the invention is shown in FIGS. 5A and 5B. In this embodiment the pointing element 7 is a rotatable element arranged symmetrically about the axis E—E. The pointing element 7 may be a bushing, ring, disc, cylinder or the like. The pointing element 7 is fitted into a mounting recess 9a or the like on the body 9 of the device. The pointing element is fitted such that part of its perimeter 7a is visible outside the body 9 and can be operated by means of a finger or such. The pointing element 7 includes a spindle 7b or a corresponding bearing element fitted along the rotation axis E—E so that said bearing element attaches the painting element in a suitable manner to the body 9.

In connection with the pointing element 7 there are in this case a plurality of magnetic elements 8, in particular separate magnets, which are arranged at a distance, advantageously at regular angular distances, from each other at the perimeter 7a of the pointing element 7. A winding 10 or a corresponding magnetic field detector is fitted below the painting element 7, in the mounting recess 9a, in the immediate vicinity of its perimeter 7a at a distance of a small air gap 4. The winding 10 in turn is fitted on a printed circuit board 11 which has a preprocessing unit (cf. FIG. 1A or FIG. 2A, for example) to process the measurement signal obtained from the winding 10. Usually the printed circuit board 11 also includes other electronic components controlling the functions of the device.

The diameter h of the rotary disc-like or cylindrical element serving as a pointing element 7 is advantageously 10 to 30 mm, for example, and its width k is advantageously 2 to 40 mm. The width i of the air gap 4 is on the order of 2 mm, advantageously about 1 mm.

Figure 6A:
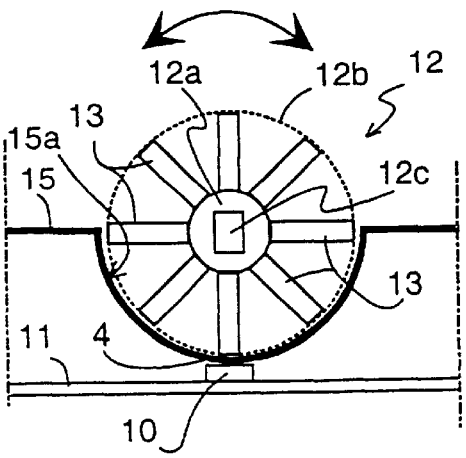
FIG. 6A shows a partial cross section of a second painting device according to the invention and FIG. 6B shows a frontal view of it in partial cross section.
Figure 6B:
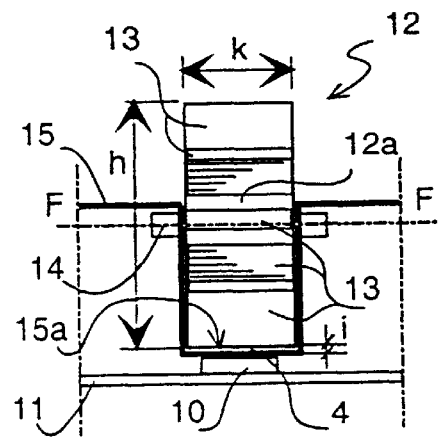

A second pointing device according to the invention is illustrated in FIGS. 6A and 6B. The pointing element 12 is an element rotatable around its rotation axis F—F, just like in the first embodiment described above. The pointing element 12 is a toothed wheel comprising a body or hub 12a and a plurality of radial projections 13. The hub 12a includes a magnetic element 12c, advantageously a permanent magnet, and is otherwise made of a ferromagnetic material such as steel. The projections 13 also are made of a ferromagnetic material such as steel. The projections 13 extend to the perimeter 12b of the pointing element 12. The hub 12a has a spindle 14 or a corresponding bearing element on both sides of the pointing element 12. The spindle 14 is placed along the rotation axis F—F and the painting element 12 is thereby attached in a rotary manner in a mounting recess 15a to the body 15 or a corresponding part of the device just like in the example described above. In this embodiment, like the first embodiment, the winding 10, coil or a similar magnetic field detector is attached to a printed circuit board 11. The winding 10 is fitted into a mounting recess 15a below the pointing element 12 like in the embodiment of FIGS. 5A and 5B.

In the above embodiment the rotary toothed wheel serving as a pointing element 12 has the same diameter h and width k as the pointing element 7 shown in FIGS. 5A and 5B In this embodiment, too, the width i of the air gap 4 is on the order of 2 mm, advantageously about 1 mm.

Figure 7A:
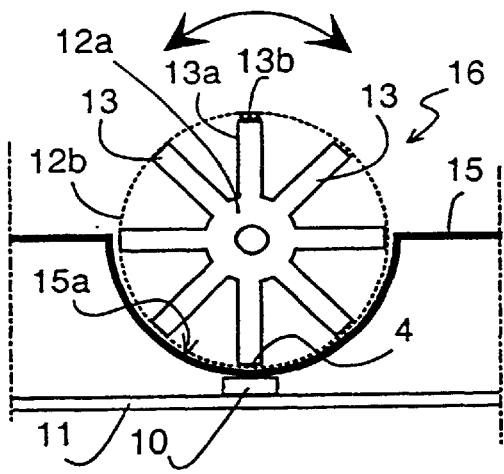
FIG. 7A shows a partial crass section of a third painting device according to the invention and FIG. 7B shows a first modification of this embodiment and FIG. 7C shows a second modification of this embodiment.
Figure 7B:
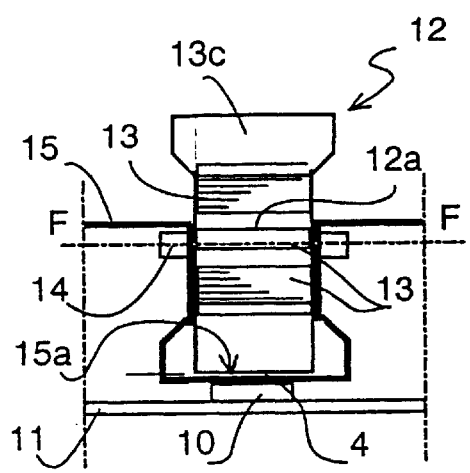
Figure 7C:
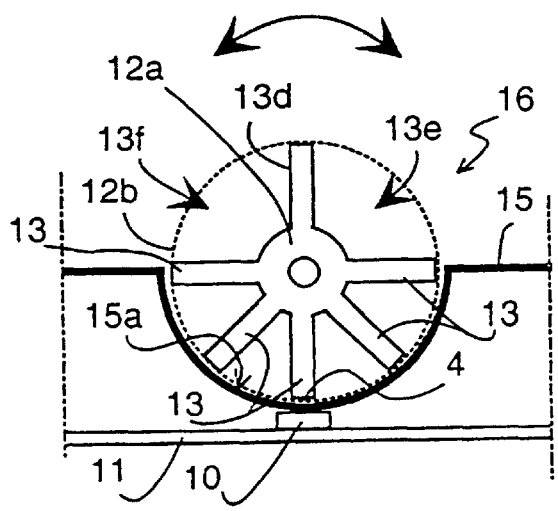

A third pointing device according to the invention is illustrated in FIG. 7A and its modifications in FIGS. 7B and 7C. This corresponds for the most part to the pointing device described above in FIGS. 6A and 6B, and like elements are denoted by like reference designators. At least one of the projections 13 in the pointing element 16, in particular 13a, is roughened 13b, rounded or otherwise similarly shaped at its free end or is equipped with a corresponding auxiliary part, FIG. 7A. At least one of the projections 13 in the pointing element 16, in particular 13c, is widened at its free end, FIG. 7B. Optionally, instead of widening, the free end of the projection can be made narrower. The purpose of roughening 13b and widening 13c the projection is to provide a means for distinguishing the projection from the other projections 13 of the pointing element 16 by means of tactile sensation when touching the projection with the tip of a finger. This provides a good tactile feedback when rotating the pointing element 16, and its position is easily recognized.

In the modification of FIG. 7C one projection 13d is separated from the other projections 13 by wider projection spacings 13e, 13f. In this case, the projections adjacent to projection 13d have been removed from the projection spacings 13e, 13f. When touching the pointing element 16 with the tip of a finger, the wider projection spacings 13e, 13f help distinguish projection 13d from the other projections 13 by means of tactile sensation.

Figure 8:
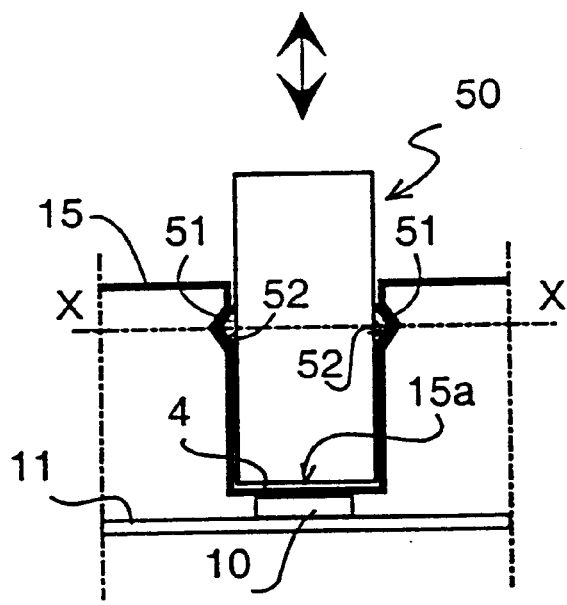
FIG. 8 shows a partial cross section of a fourth pointing device according to the invention.

A fourth pointing device according to the invention is illustrated in FIG. 8. This pointing device, too, corresponds for the most part to the pointing device described above e.g. in FIGS. 6A and 6B, so like elements are denoted by like reference designators. The painting element 50 is advantageously similar to the one in FIGS. 6A and 6B (or 5A and 5B but its attachment, implemented with bearings, in the mounting recess 15a to the device body 15 or the like is realized in a manner different from the above. On the rotation axis X—X of the pointing element 50, at opposing sides of the painting element, there are short pins 51, and in the mounting recess 15a there are corresponding hallows 52 or through holes. The short pins 51 are conical in shape or are generally protrusions rounded or beveled at their ends. The hallows 52 at the sides of the mounting recess 15a are preferably conical, too, or generally rounded relatively small recesses. An advantage of this arrangement is that the pointing element 50 can be easily snapped out of the mounting recess 15a and it can be replaced with a new pointing element, which could have a different shape or model, by pushing it into the mounting recess 15a (cf. arrow in FIG. 8). Similarly, a dirty or damaged pointing element 50 can be easily replaced.

Figure 9:
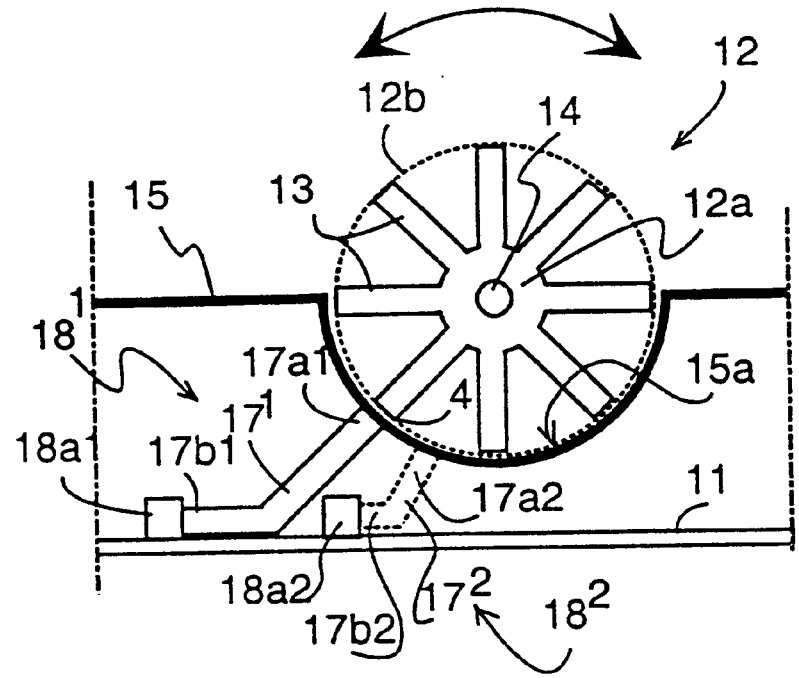
FIG. 9 shows a partial cross section of a fifth pointing device according to the invention and particularly an arrangement of the magnetic element and detector.

A fifth pointing device according to the invention is illustrated in FIG. 9. The pointing element in this embodiment corresponds to the painting element 12 according to FIGS. 6A and 6B, for example, and like elements are therefore denoted by like reference designators. The magnetic field detector $18^1$ differs from the ones described earlier. In the embodiments disclosed above the magnetic field detector, say a winding 10, is placed in the immediate vicinity of the painting element 12. In this embodiment the magnetic field detector proper, such as a Hall sensor 18a1, is placed at a distance from the pointing element 12. Between them there is provided a ferromagnetic transmission line $17^1$ a first end 17a1 of which is in the immediate vicinity of the pointing element 12 while a second end 17b1 of the transmission line is fitted to the Hall sensor 18a1. With this arrangement, the detector proper 18a1 can be placed at a distance from the pointing element 12.

A drawback of the embodiment described above is that a single detector $18^1$ cannot detect the direction of movement of the painting element 12. To that end the pointing device must include a separate detector for the direction of movement of the pointing element 12. When the second magnetic field detector $18^2$, which is depicted in FIG. 9 by dotted lines, is placed at a suitable distance from the first detector $18^1$, the direction of movement of the pointing element 12 can be detected. Signals obtained from the two detectors $18^1$ and $18^2$ are preprocessed using e.g. a preprocessing unit according to FIG. 3A.

The second detector $18^2$ is similar in structure to the first detector $18^1$. The Hall sensor $18a2$ is placed at a distance from the pointing element 12. Between them there is, provided a ferromagnetic transmission line $17^2$ a first end $17a2$ of which is in the immediate vicinity of the pointing element 12 while a second end $17b2$ of the transmission line is fitted to the Hall sensor $18a2$.

Optionally, in the pointing device according to FIG. 9, the Hall sensor $18a1$ (or Hall sensors $18a1$, $18a2$) can be fitted directly at a distance of the air gap a from the perimeter $12b$ of the pointing element 12.

A sixth pointing device according to the invention is illustrated in FIGS. 10A, 10B This is an advantageous modification of the embodiment depicted in FIG. 9. In this case the pointing element 120 in the pointing device is comprised of two magnetically separate and parallel pointing element units $12^1$, $12^2$ both of which correspond in their structure to the pointing element of FIGS. 6A and 6B, for example. The pointing device comprises two detectors $18^3$, $18^4$ for both pointing element units $12^1$, $12^2$. Both pointing element units $12^1$, $12^2$ are toothed wheels but they are fitted onto each other at an angle a with respect to the axis 14 so that the projections $13^1$, $13^2$ of the pointing element units are in a shifted position relative to each other. Angle $\alpha$ is advantageously an the order of 5 to 15 degrees, preferably 10 degrees. The hubs $12a1$, $12a2$ of the both pointing element units $12^1$, $12^2$ comprise a magnetic element, advantageously a permanent magnet. These magnetic elements produce magnetic fields of unequal strengths so that the pointing element units $12^1$, $12^2$ can be distinguished from one another by means of detectors measuring the strengths of the magnetic fields, especially by Hall sensors or detectors $18^3$, $18^4$. The Hall sensors $18^3$, $18^4$ are placed at a distance of the air gap 4 from the outer perimeter of the pointing element units $12^1$, $12^2$. Alternatively, the Hall sensors $18^3$, $18^4$ are realized in a manner similar to that described in connection with FIG. 9, corresponding to Hall sensor $18^1$. In that case the Hall sensors $18^3$, $18^4$ are advantageously connected to a preprocessing unit according to FIG. 3A.

A seventh pointing device according to the invention is illustrated in FIG. 11A. The pointing element 19 is advantageously like the one described above in connection with FIGS. 6A and 6B. In this embodiment, however, the spindle 20 is made of a ferromagnetic material such as steel. The pointing element 19 is adapted so as to be rotatable about the axis G—G and it is attached by the spindle 20 to the device body 15 or the like in a suitable manner. A magnetic element 22, in this case a permanent magnet, is provided on the rotation axis G—G of the pointing element 19, in the immediate vicinity of one end of the spindle. From the permanent magnet 22 a magnetic flux is transferred through the spindle 20 to the pointing element 19 and its projections (cf. FIG. 6A) and further to be sensed by the detector 21. The detector 21 is e.g. a winding or coil Like in the embodiments of FIGS. 5A, 5B and 6A, 6B, for example.

In the embodiment described above, FIG. 11A, the magnetic element is a permanent magnet 22. FIG. 11B shows an alternative arrangement in which the permanent magnet is replaced by an electromagnet 23. In other aspects the pointing device of FIG. 11B is identical to that of FIG. 11A and like elements are denoted by like reference designators.

A magnetic field, specifically a magnetic flux, can be coupled to the pointing element in a manner other than the one described above. In the applications described above, like in the embodiments of FIGS. 6A and 6B, the magnetic element $12c$ is fitted to the hub $12a$ of the pointing element. In an eighth pointing device according to the invention shown in FIG. 12A the magnetic element 28 is fitted to the body 29 of the device.

Figure 12A:
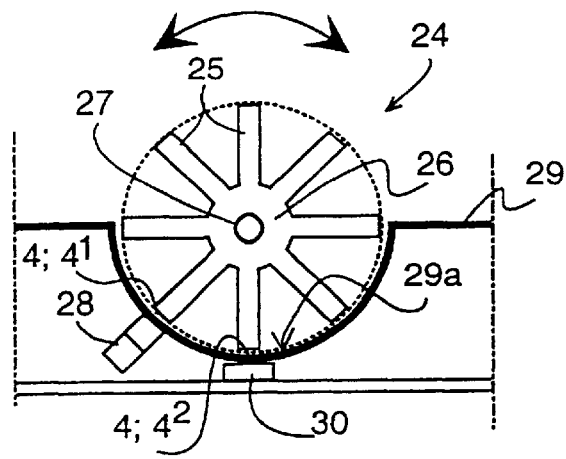
FIG. 12A shows a side view of an eighth pointing device according to the invention in partial cross section and FIG. 12B shows a modification of this embodiment.

In the eighth embodiment of the invention, FIG. 12A, the pointing element 24 is realized as a toothed wheel comprising radial projections 25 and a hub 26. The projections 25 and the hub 26 are attached to each other in a fixed manner and are made of a ferromagnetic material such as steel. The magnetic element 28 is fitted to the device body 29, in a mounting recess $29a$ at a suitable distance from the magnetic field detector 30. The distance between the magnetic element 28 and detector 30 equals the spacing between the projections 25 on the perimeter of the pointing element 24 or a multiple of the spacing so that, when moving the control element 24, two of the projections always simultaneously match the magnetic element 28 and detector 30. Between the pointing element 24, specifically its projections 25, and the detector 30 there is an air gap 4; $4^1$. Similarly, there is an air gap 4; $4^2$ between the pointing element 24 and the magnetic element 28.

Figure 12B:
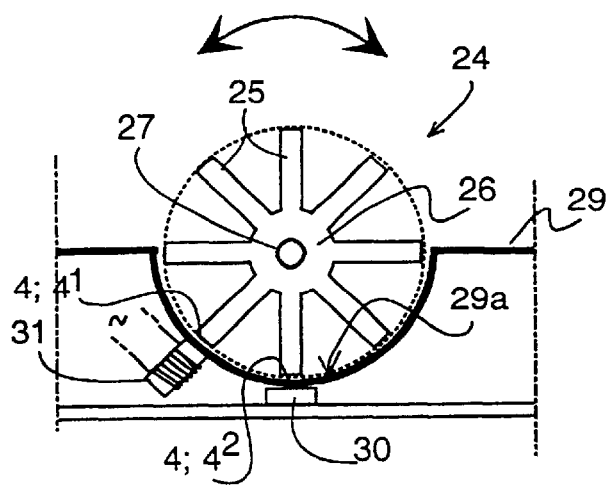

In applications according to FIG. 12A the magnetic element is realized using a permanent magnet 28, whereas in an application according to FIG. 12B the magnetic element is realized using an electromagnet 31. In other aspects the embodiments of FIGS. 12A and 12B are identical, and like elements in them are denoted by like reference designators. The magnetic flux of the magnetic element 28, 31 is conducted through one projection 25 to all the projections of the pointing element 24 and thereby a projection is detected when it comes in the immediate vicinity of the detector 30, as is illustrated in the examples of FIGS. 12A and 12B, for example. It should be noted that just at the same time the magnetic flux of the magnets 28, 31 is coupled to the pointing element 24 through another projection.

Figure 13A:
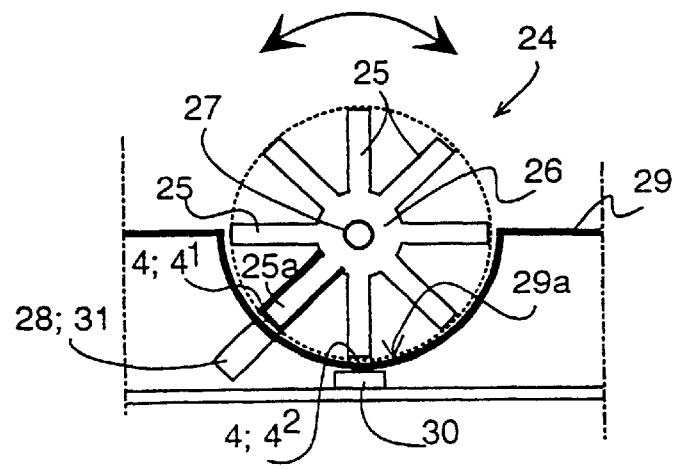
FIG. 13A shows a side view of a ninth pointing device according to the invention in partial cross section and FIG. 13B shows a modification of this embodiment.

A ninth embodiment of the invention is illustrated in FIG. 13A. In its basic structure this embodiment corresponds to the embodiment of FIGS. 12A and 12B and like elements are denoted by like reference designators. The pointing element 24 in FIG. 13A is realized as a toothed wheel comprising radial projections 25 and a hub 26. One of the projections, a first projection $25a$, is different from the rest; advantageously the area of its free end is greater than that of the other projections 25. So it is wider and/or thicker than the other projections 25. The magnetic flux of the magnetic element 28, 31 is conducted through this first projection $25a$ to all the other projections 25 of the pointing element 24 and thereby a projection is detected when it comes in the immediate vicinity of the detector 30. However, the first projection $25a$, which has a large effective area, resists moving away from the effective range of the magnetic element 28; 31 more than the other projections 25 which have a smaller area. This is perceived as a greater resistance to movement when moving the pointing element 24 with a finger whereby the user will know that the pointing element 24 is in a certain position, i.e. the first projection $25a$ is in the vicinity of the magnetic element 28; 31.

Figure 13B:
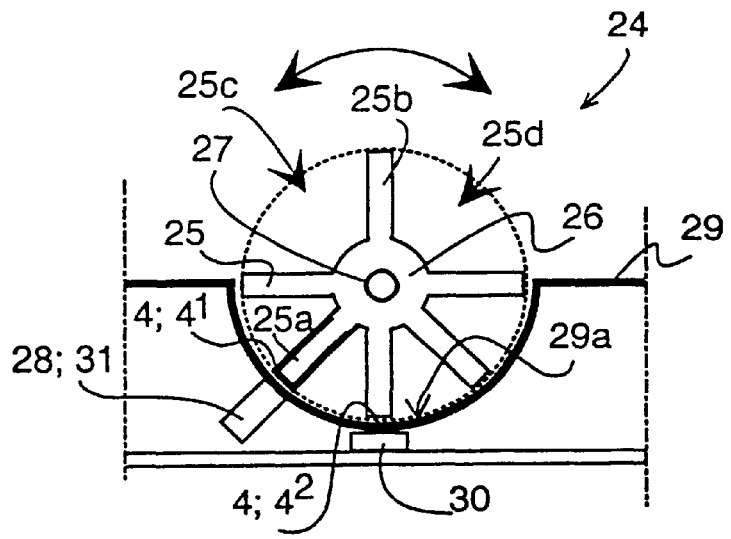

FIG. 13B shows a modification of the ninth embodiment of the invention. This corresponds in its structure to the pointing device described above in conjunction with FIG. 13A with the exception that there are big projection spacings $25c$ and $25d$ on both sides of a second projection $25b$. The second projection $25b$ points straight up when the first projection $25a$ is in the immediate vicinity of the magnetic element 28; 31. Thus the second projection $25b$ is easily recognizable and, moreover, its position in which it points straight up is magnetically locked, up to a certain point of exertion of force.

Figure 14:
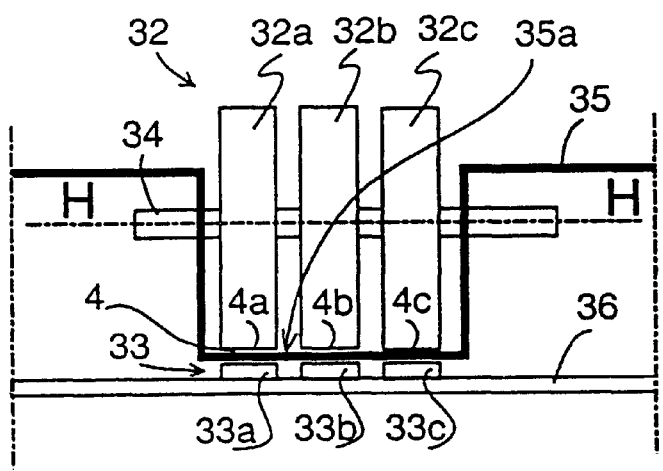
FIG. 14 shows a partial cross section of a tenth painting device according to the invention.

A tenth pointing device according to the invention is shown frontally in FIG. 14 in partial cross section. In this case the pointing device 32 comprises a plurality of separate pointing elements 32; 32a, 32b, 32c. These pointing elements have a structure similar to that of a pointing element in an embodiment described above, say, the pointing element 12 of FIG. 6A. The pointing elements 32; 32a, 32b, 32c are fitted to a mounting recess 35a in the device body 35 or the like. In the vicinity of each pointing element 32; 32a, 32b, 32c there is a corresponding detector 33; 33a, 33b, 33c. Advantageously the detectors 33 are implemented in the same manner as in some of the embodiments of the invention described above, say, in FIG. 6A. Each pointing element-detector combination 32a, 33a; 32b, 33b; 32c, 33c controls a separate menu or a corresponding pointer on a display. Pointing elements 32; 32a, 32b, 32c are adapted so as to be independently rotatable about a common axis H—H. Advantageously they are equipped with bearings and attached to a common spindle 34 which in turn is attached to the body or housing 35 of the device. Detectors 33; 33a, 33b, 33c are fitted directly onto a circuit board 36 in the immediate vicinity of a mounting recess 40a and the perimeters of the pointing elements. Between the pointing elements 32; 32a, 32b, .32c and detectors 33; 33a, 33b, 33c there is an air gap 4; 4a, 4b, 4c.

Figure 15A:
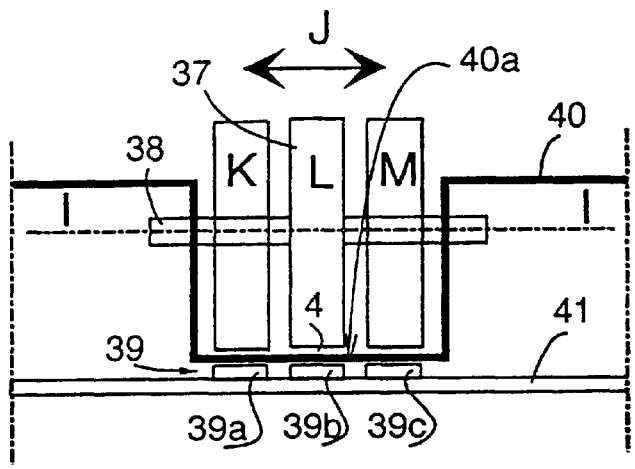
FIG. 15A shows a frontal view of an eleventh pointing device according to the invention in partial cross section and FIGS. 15B, 15C and 15D show modifications of this embodiment.

An eleventh pointing device according to the invention is shown in FIG. 15A. This embodiment of the pointing device comprises one pointing element 37 which is in accordance with an embodiment described above e.g. in FIG. 6A. The pointing element 37 is fitted into a mounting recess 40a in the body 40 or such of the device, the width of the mounting recess in this case corresponding to that of at least three parallel pointing elements 37. The pointing element 37 is placed in a rotatable manner on axis I—I such that it can be moved in the direction of the axis in the mounting recess 40a as indicated by arrow J. The pointing element 37 is fitted preferably in a movable manner to the spindle 38. In this embodiment the pointing element 37 has three positions K, L, M along the axis I—I in the mounting recess 40a, as shown in FIG. 15A. In each position the pointing element 37 is in the immediate vicinity of the detector 39; 39a, 39b, 39c. Thus the pointing element 37 can be moved between the different positions K, L, M and in each position the pointing element affects the respective detector 39a, 39b, 39c through which three different menus or pointers on a display can be controlled. The detectors 39; 39a, 39b, 39c are attached to a printed circuit board 41. The pointing element 37 and detectors 39 can be realize according to an embodiment described above. In each position K, L, M of the pointing element there is an air gap 4 between the pointing element 37 and detector 39; 39a, 39b, 39c.

Figure 15B:
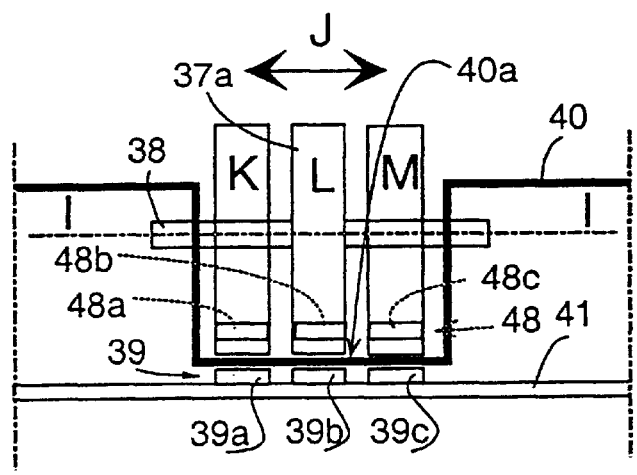

FIG. 15B shows a modification of the pointing device of FIG. 15A. Like elements are denoted by like reference designators. In this modification there is in the mounting recess 40a, in connection with each of the alternative positions K, L, M of the pointing element 37a, a magnetic element 48a, 48b, 48c such as a permanent or electromagnet, installed in the same way as in the embodiment depicted in FIG. 12A (or 12B). An advantage of the magnetic elements 48a, 48b, 48c is that they keep the pointing element 37a in the selected position K, L or M and reasonably resist axial movement I—I of the pointing element 37a from a position to another. This way, tactile feedback is good in each position.

Figure 15C:
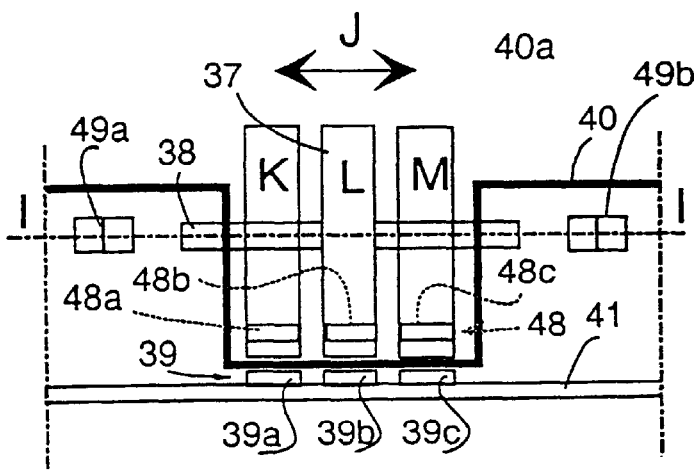

FIG. 15C shows a second modification of the pointing device of FIG. 15A. Like elements are denoted by like reference designators. In this modification there is in connection with both ends of the axle 38 of the pointing element 37a a magnetic element 49a, 49b such as a permanent or electromagnet (cf. embodiments of FIGS. 11A and 11B). By means of the magnetic elements 49a, 49b the painting element 37a in its extreme positions K, M can be strongly kept in place by a magnetic field. The axle 38 is in this case implemented using a suitable ferromagnetic material such as steel.

Figure 15D:
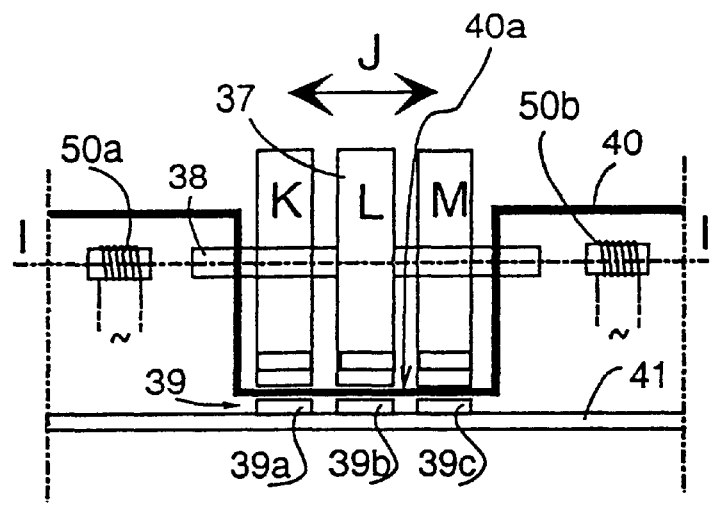

FIG. 15D shows a modification of the pointing device of FIG. 15C. In this modification, too, there is in connection with both ends of the axle 38 of the painting element 37a a magnetic element 50a, 50b, particularly an electromagnet (cf. embodiment of FIG. 11B). By means of the electromagnets 50a, 50b, the pointing element 37a in its extreme positions K, M can be locked to its place by a magnetic field. The axle 38 is in this case implemented using a suitable ferromagnetic material such as steel. In addition, the axle 38 and the pointing element 37a connected to it can be centered in position L by changing the polarities of the opposing electromagnets 50a, 50b such that they are in opposite phases relative to each other and the poles with like signs are repelling each other.

Figure 16:
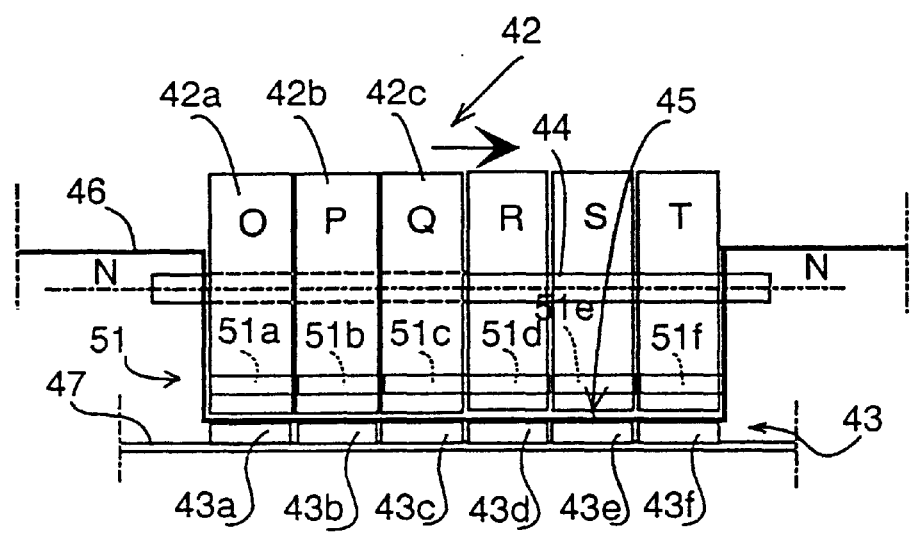
FIG. 16 shows a frontal view of a twelfth pointing device according to the invention in partial cross section.

A twelfth pointing device according to the invention is shown in FIG. 16. This pointing device comprises a plurality of pointing elements 42; 42a, 42b, 42c and detectors 43; 43a, 43b, 43c, 43d, 43e and 43f. The pointing elements 42 are fitted to a spindle 44 an the rotation axis N—N in such a manner that the pointing elements on the spindle 44 are separately movable in a mounting recess 45 reserved for the pointing elements 42. The detectors 43 are attached advantageously to a printed circuit board 47. In this embodiment there are three parallel pointing elements 42, and the mounting recess 45 has room for them plus a space that equals the space taken by the three painting elements so that the pointing elements 42; 42a, 42b 42c can be moved in the mounting recess 45 between the pointing element positions O, P, Q, R, S and T. Said detectors 43 are placed in the body or housing 46 of the: device so as to correspond to the positions O, P, Q, R, S and T of the pointing elements. Thus the painting device can be used to control a great number of various menus on a display, in this case six menus. The pointing elements 42 can be moved parallely to the various positions O, P, Q, R, S and T and thus at least three menus controlled by a pointing element can be selected.

In the pointing device of FIG. 16 it is advantageous to have in connection with the positions O, P, Q, R, S and T of the pointing elements 42; 42a, 42b, 42c a magnetic element 51; 51a, 51b, 51c, 51d, 51e, 51f such as a permanent or electromagnet in the mounting recess 45, installed in the same manner as in the embodiments of FIGS. 12A (or 12B) and 14B. An advantage of the magnetic elements 51; 51a, 51b, 51c. 51d, 51e, 51f is that they keep the pointing elements in the selected positions O, P, Q, R, S and T. The magnetic elements 51 are attached to the mounting recess 45 in the housing 46 or corresponding body.

The invention is not limited to the embodiments described above but many modifications are possible without departing from the inventional idea defined by the claims attached hereto.

What is claimed is:

1. A pointing device comprising a movable pointing element and a detector that gives a detection signal on the basis of a movement of the pointing element that is detected and utilized to point out information on a display wherein the movable pointing element and detector comprise means for generating a magnetic field and for detecting a magnetic field, and wherein the pointing element is placed in a mounting recess on a shaft in the direction of which it is movable between a plurality of parallel positions and at the same time between menu groups.

2. A pointing device comprising a movable pointing element and a detector that gives a detection signal on the basis of a movement of the pointing element that is detected and utilized to point out information on a display, wherein the movable pointing element and detector comprise means for generating a magnetic field, and wherein a plurality of pointing elements are placed in parallel in one and the same mounting recess.

3. A pointing device according to claim 2, characterized in that a plurality of pointing elements (42; 42a, 42b, 42c) are paced in a mounting recess (45) so as to be axially movable between different positions (O, P, Q, R, S and T).

4. A pointing device comprising a movable pointing element and a detector, which pointing element is a rotary element comprising means for generating a magnetic field, which pointing element is fitted into a mounting recess on a body of the device and which detector comprises means for detecting a magnetic field, wherein the rotary element has a rotation axis and is arranged symmetrically about the rotation axis and the means for generating a magnetic field includes a plurality of magnetic elements places in a perimeter of the pointing element at a distance from one another and the means for detecting a magnetic field is fitted below the pointing element in the mounting recess proximate the perimeter of the pointing element to define an air gap therebetween.

5. The pointing device according to claim 4, wherein on the rotation axis of the pointing element at opposing sides of the pointing element there are arranged short pins and, correspondingly, in the mounting recess there are arranged hollows in such a way that the pointing element can be snapped out of the mounting recess and a corresponding element can be inserted in the mounting recess.

6. The pointing device according to claim 5, wherein at least one of the magnetic elements is a permanent magnet.

7. The pointing device according to claim 4, wherein the means for detecting a magnetic field detector is a coil or a corresponding component.

8. The pointing device according to claim 4, wherein the means for detecting the magnetic field is a Hall sensor.

9. The pointing device according to claim 4, wherein the means for detecting the magnetic field is a magnetoresistive sensor.

10. The pointing device according to claim 4, wherein the pointing element is placed in the mounting recess on a shaft in the direction of which it is movable between a plurality of parallel positions and at the same time between menu groups or the like.

11. The pointing device according to claim 4, wherein the pointing element comprises a plurality of pointing elements that are placed in parallel in the mounting recess.

12. A pointing device comprising a movable pointing element and a detector, which pointing element is a rotary element comprising means for generating a magnetic field, which pointing element is fitted into a mounting recess on a body of the device and which detector comprises means for detecting a magnetic field, the rotary element having a rotation axis and comprising a hub through which the rotation axis extends and a plurality of radial projections extending from the hub to a perimeter of the pointing element, the hub and projections being made of a ferromagnetic material, and the means for generating a magnetic field includes a magnetic element placed in connection with radial projections, wherein the means for detecting a magnetic field is fitted below the pointing element in the mounting recess proximate the perimeter of the pointing element to define an air gap therebetween.

13. The pointing device according to claim 12, wherein the magnetic element is in the hub of the pointing element and the plurality of projections are connected to the hub.

14. The pointing device according to claim 13, wherein one of the projections has a free end shaped in such a manner that the free end is distinguishable from the other projections.

15. The pointing device according to claim 12, wherein one of the projections is separated from the rest of the projections by means of wider projection spacings.

16. The pointing device according to claim 12, wherein on the rotation axis of the pointing element, at opposing sides of the pointing element there are arranged short pins and, correspondingly, in the mounting recess there are arranged hollows in such a way that the pointing element can be snapped out of the mounting recess and another pointing element can be inserted in the mounting recess.

17. The pointing device according to claim 12, wherein the pointing element comprises a shaft about which the pointing element can be rotated, and the magnetic element is placed on the rotation axis of the pointing element in proximity of the shaft, which shaft is made of a ferromagnetic material.

18. The pointing device according to claim 12, wherein the magnetic element is placed outside the pointing element, in proximity of the perimeter of the pointing element to transfer a magnetic flux to the pointing element.

19. The pointing device according to claim 12, wherein the magnetic element is a permanent magnet or and electromagnet.

20. The pointing device according to claim 12, wherein one of the projections is different from the others in that it has a larger free end area than the other projections.

21. The pointing device according to claim 12, wherein one of the projections is shaped at its free end such that the projection is distinguishable from other projections.

22. The pointing device according to claim 12, wherein one of the projections is separated from the rest of the projections by means of wider projection spacings.

23. The pointing device according to claim 12, wherein the means for detecting a magnetic field is a coil or a corresponding component.

24. The pointing device according to claim 12, wherein there is connected to the magnetic field means for detecting a preprocessing apparatus in which an induced voltage pulse is used to determine a direction of movement of the pointing element relative to the means for detecting.

25. The pointing device according to claim 12, wherein the means for detecting a magnetic field detector is a Hall sensor, or magnetoresistive sensor.

26. The pointing device according to claim 12, wherein the means for detecting a magnetic field comprises a ferromagnetic transmission line.

27. The pointing device according to claim 12, wherein the pointing element is placed in the mounting recess on a shaft in the direction of which the pointing element is movable between a plurality of parallel positions and at the same time between menu groups or the like.

28. The pointing device according to claim 12, wherein the pointing element comprises a plurality of pointing elements placed in parallel in the mounting recess.

29. The pointing device according to claim 28, wherein the plurality of pointing elements are placed in the mounting recess so as to be axially movable between different positions.

* * * * *